(12) United States Patent
Tetsuka (10) Patent No.: US 9,517,812 B2
(45) Date of Patent: Dec. 13, 2016

(54) BICYCLE COMPONENT OPERATING DEVICE FOR CONTROLLING A BICYCLE COMPONENT BASED ON A SENSOR TOUCHING CHARACTERISTIC

(75) Inventor: Toshio Tetsuka, Hyogo (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 13/323,876

(22) Filed: Dec. 13, 2011

(65) Prior Publication Data

US 2013/0151073 A1 Jun. 13, 2013

(51) Int. Cl.
| | |
|---|---|
| *B62M 25/04* | (2006.01) |
| *A63B 69/16* | (2006.01) |
| *B62K 21/00* | (2006.01) |
| *G06F 3/01* | (2006.01) |
| *B62K 3/00* | (2006.01) |
| *G06F 3/0488* | (2013.01) |
| *B62K 21/26* | (2006.01) |
| *B62K 21/12* | (2006.01) |
| *B62M 25/08* | (2006.01) |
| *B62K 11/14* | (2006.01) |

(Continued)

(52) U.S. Cl.
CPC .............. *B62M 25/04* (2013.01); *A63B 69/16* (2013.01); *B62K 3/00* (2013.01); *B62K 11/14* (2013.01); *B62K 21/00* (2013.01); *B62K 21/12* (2013.01); *B62K 21/26* (2013.01); *B62K 23/02* (2013.01); *B62M 25/00* (2013.01); *B62M 25/08* (2013.01); *G06F 3/016* (2013.01); *G06F 3/0488* (2013.01); *G06F 3/04883* (2013.01); *B62M 2025/003* (2013.01); *B62M 2025/006* (2013.01)

(58) Field of Classification Search
CPC ........... A63B 69/16; B62K 3/00; B62K 11/14; B62K 21/00; B62K 21/12; B62K 21/26; B62K 23/02; B62M 25/00; B62M 2025/003; B62M 2025/006; B62M 25/08; B62M 25/04; G06F 3/0488; G06F 3/016; G06F 3/04883
USPC ............................. 701/37, 51; 345/156, 173
See application file for complete search history.

(56) References Cited

U.S. PATENT DOCUMENTS

| | | | | |
|---|---|---|---|---|
| 4,492,904 | A * | 1/1985 | Graham | .................. 318/444 |
| 6,369,717 | B1 * | 4/2002 | Damiani | ............... B60K 35/00 |
| | | | | 340/815.4 |

(Continued)

FOREIGN PATENT DOCUMENTS

| | | |
|---|---|---|
| CN | 1963735 A | 5/2007 |
| CN | 101329608 A | 12/2008 |

(Continued)

OTHER PUBLICATIONS

European Search Report of corresponding EP Application No. 12 17 9600.7 dated Apr. 11, 2013.

*Primary Examiner* — Thomas G Black
*Assistant Examiner* — Sze-Hon Kong
(74) *Attorney, Agent, or Firm* — Global IP Counselors (57) ABSTRACT

A bicycle component operating device includes a touch sensor and a controller. The controller is configured to control a bicycle component based on a control signal from the touch sensor. The touch sensor is separate from the bicycle component and is configured to provide the control signal to the controller based on a touching characteristic in which a user performs a subsequent touching of the touch sensor after performing an initial touching of the touch sensor such that the initial touching does not cause the controller to control the bicycle component.

10 Claims, 7 Drawing Sheets

(51) Int. Cl.
*B62K 23/02* (2006.01)
*B62M 25/00* (2006.01)

(56) References Cited

U.S. PATENT DOCUMENTS

| | | | |
|---|---|---|---|
| 7,345,679 B2* | 3/2008 | Katayose | 345/173 |
| 7,612,759 B2* | 11/2009 | Horiuchi | 345/104 |
| 8,086,366 B2* | 12/2011 | Bertosa | G07C 5/008 |
| | | | 701/33.2 |
| 8,181,981 B2* | 5/2012 | Stenberg | 280/281.1 |
| 2002/0139220 A1* | 10/2002 | Irie | 74/551.1 |
| 2003/0171190 A1* | 9/2003 | Rice | 482/57 |
| 2006/0026521 A1* | 2/2006 | Hotelling | G06F 3/0418 |
| | | | 715/702 |
| 2006/0047372 A1* | 3/2006 | Uno | 701/1 |
| 2006/0047386 A1* | 3/2006 | Kanevsky et al. | 701/36 |
| 2006/0252543 A1* | 11/2006 | Van Noland et al. | 463/37 |
| 2007/0207885 A1* | 9/2007 | Watarai | 474/70 |
| 2007/0213908 A1* | 9/2007 | Guderzo et al. | 701/51 |
| 2007/0281828 A1* | 12/2007 | Rice | 482/4 |
| 2008/0058170 A1* | 3/2008 | Giannascoli et al. | 482/57 |
| 2008/0060861 A1* | 3/2008 | Baur et al. | 180/65.6 |
| 2008/0143686 A1* | 6/2008 | Yeh et al. | 345/173 |
| 2008/0210046 A1* | 9/2008 | De Perini | 74/502.2 |
| 2009/0009366 A1* | 1/2009 | Chiu | G06F 3/04855 |
| | | | 341/20 |
| 2009/0188340 A1* | 7/2009 | Tetsuka et al. | 74/473.13 |
| 2009/0192673 A1* | 7/2009 | Song et al. | 701/37 |
| 2009/0210110 A1* | 8/2009 | Dybalski et al. | 701/29 |
| 2009/0235772 A1* | 9/2009 | Naka et al. | 74/502.2 |
| 2009/0259397 A1* | 10/2009 | Stanton | G01C 21/3664 |
| | | | 701/469 |
| 2009/0295743 A1* | 12/2009 | Nakajoh | G06F 3/04883 |
| | | | 345/173 |
| 2010/0097325 A1* | 4/2010 | Nagao et al. | 345/173 |
| 2010/0182270 A1* | 7/2010 | Caliskan | G06F 1/3262 |
| | | | 345/174 |
| 2010/0198453 A1* | 8/2010 | Dorogusker et al. | 701/33 |
| 2010/0288567 A1* | 11/2010 | Bonne | 178/18.01 |
| 2010/0294068 A1* | 11/2010 | Fujii et al. | 74/473.13 |
| 2010/0299638 A1* | 11/2010 | Choi | G06F 3/04883 |
| | | | 715/835 |
| 2011/0001722 A1* | 1/2011 | Newman et al. | 345/174 |
| 2011/0050638 A1* | 3/2011 | Lee | 345/174 |
| 2011/0060986 A1* | 3/2011 | Yang | G06F 3/04845 |
| | | | 715/702 |
| 2011/0082627 A1* | 4/2011 | Small et al. | 701/48 |
| 2011/0109578 A1* | 5/2011 | Waller et al. | 345/173 |
| 2011/0157057 A1* | 6/2011 | Hata | G06F 1/1681 |
| | | | 345/173 |
| 2011/0169750 A1* | 7/2011 | Pivonka et al. | 345/173 |
| 2011/0310024 A1* | 12/2011 | Sakatsume | G06F 3/0416 |
| | | | 345/173 |
| 2011/0319231 A1* | 12/2011 | Giannascoli et al. | 482/61 |
| 2012/0110517 A1* | 5/2012 | Sparks et al. | 715/863 |
| 2012/0154296 A1* | 6/2012 | Hinckley | G06F 3/0416 |
| | | | 345/173 |
| 2012/0159402 A1* | 6/2012 | Nurmi et al. | 715/863 |
| 2012/0245809 A1* | 9/2012 | Ichida | 701/51 |
| 2012/0262403 A1* | 10/2012 | Tissot | 345/173 |
| 2012/0283894 A1* | 11/2012 | Naboulsi | A61B 5/18 |
| | | | 701/1 |
| 2012/0327232 A1* | 12/2012 | Yang et al. | 348/148 |
| 2013/0015964 A1* | 1/2013 | Muller et al. | 340/459 |
| 2013/0059698 A1* | 3/2013 | Barton | 482/63 |
| 2013/0061705 A1* | 3/2013 | Jordan | 74/473.13 |
| 2013/0072356 A1* | 3/2013 | Machida et al. | 482/58 |
| 2013/0083074 A1* | 4/2013 | Nurmi et al. | 345/650 |
| 2013/0100044 A1* | 4/2013 | Zhao et al. | 345/173 |
| 2013/0147749 A1* | 6/2013 | Matthews | G06F 3/0488 |
| | | | 345/173 |

FOREIGN PATENT DOCUMENTS

| | | |
|---|---|---|
| FR | 2654698 A1 | 5/1991 |
| JP | 60-22031 U | 2/1985 |
| JP | 3736482 B | 11/2005 |
| TW | 533163 B | 5/2003 |
| TW | 200928940 A | 7/2009 |
| TW | 200945176 A | 11/2009 |
| TW | 201001237 A | 1/2010 |
| TW | M380252 U | 5/2010 |
| TW | 201109996 A | 3/2011 |
| TW | 201117066 A | 5/2011 |
| TW | 201118683 A | 6/2011 |
| TW | 201135560 A | 10/2011 |

* cited by examiner

BICYCLE COMPONENT OPERATING DEVICE FOR CONTROLLING A BICYCLE COMPONENT BASED ON A SENSOR TOUCHING CHARACTERISTIC

BACKGROUND

Field of the Invention

This invention generally relates to a bicycle component operating device. More specifically, the present invention relates to a bicycle component operating device that controls a bicycle component based on a touching characteristic of a touch sensor by a user.

Background Information

Many bicycles include various controllable components such as derailleurs, an adjustable seat post, an adjustable suspension, a cycle computer and so on. The controllable components are typically controlled by bicycle component operating devices, such as switches that can be manipulated by a rider. The switches are mounted at positions on the bicycle that are generally accessible by the rider when the bicycle is in motion.

SUMMARY

However, a need exists for an improved bicycle component operating device.

Accordingly, one aspect is to provide a bicycle component operating device that controls a bicycle component based on a touching characteristic of a touch sensor by a user.

In view of the state of the known technology, a bicycle component operating device includes a touch sensor and a controller. The controller is configured to control a bicycle component based on a control signal from the touch sensor. The touch sensor is separate from the bicycle component and is configured to provide the control signal to the controller based on a touching characteristic in which a user performs a subsequent touching of the touch sensor after performing an initial touching of the touch sensor such that the initial touching does not cause the controller to control the bicycle component.

These and other objects, features, aspects and advantages of the disclosed bicycle component operating device will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
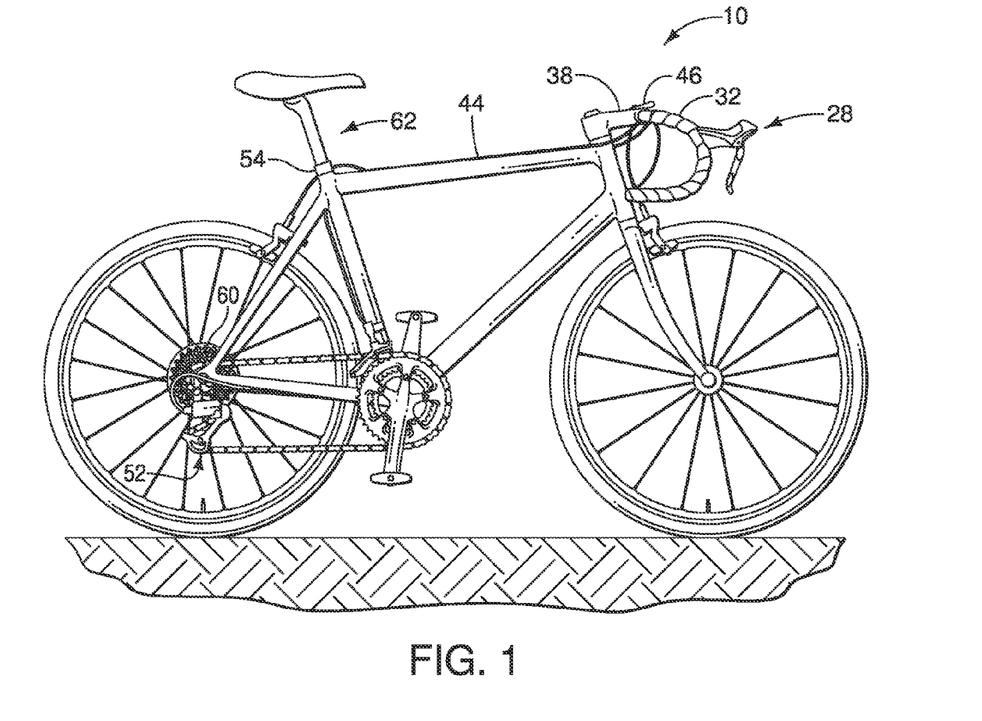
FIG. 1 is a side elevational view of a bicycle that is equipped with a bicycle component operating device in accordance with an illustrated embodiment.
Figure 2:
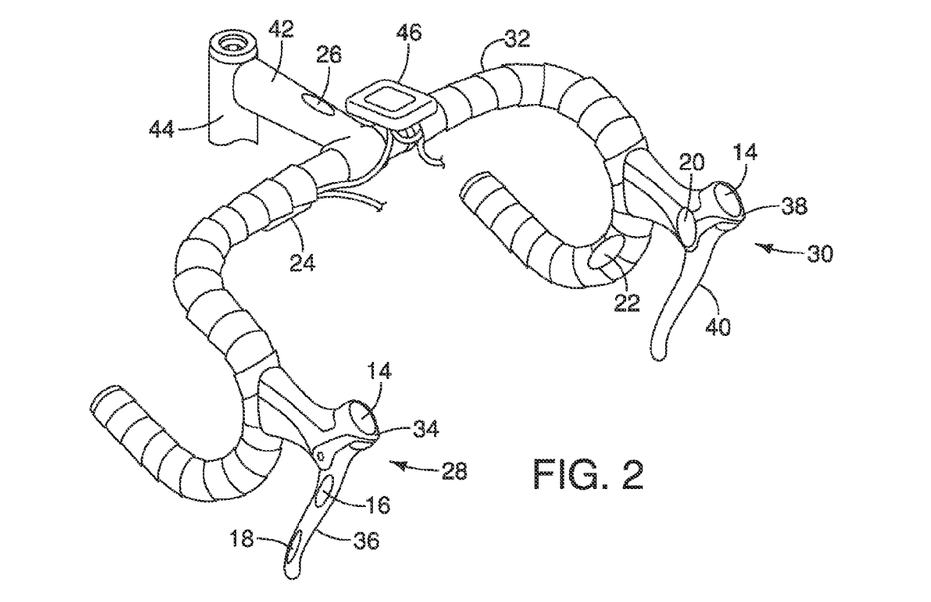
FIG. 2 is a detailed perspective view of the handlebar area of the bicycle shown in FIG. 1.
Figure 3:
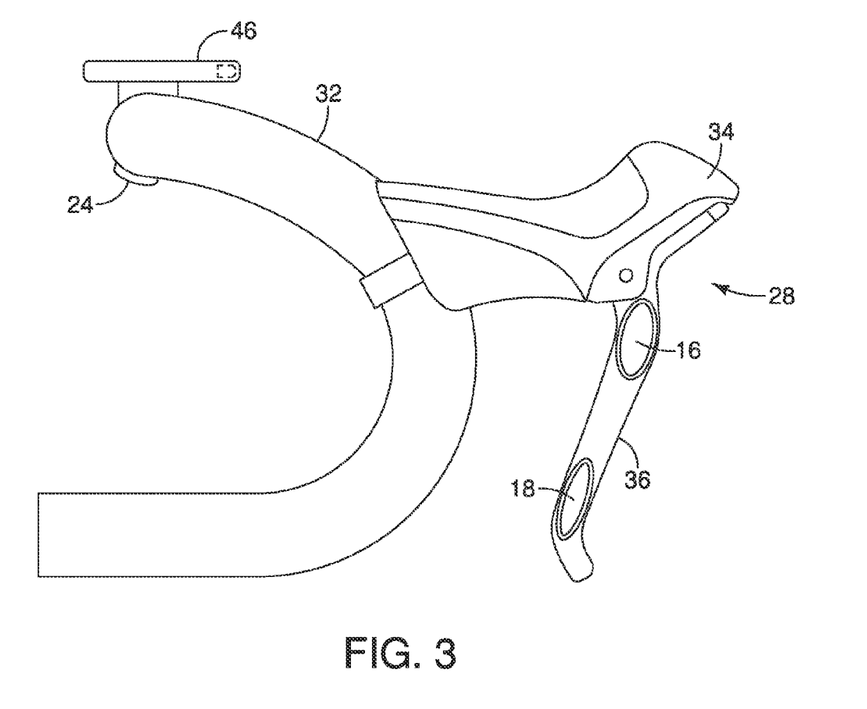
FIG. 3 is a right side elevational view of the right handlebar and brake assembly of the bicycle shown in FIG. 1.
Figure 4:
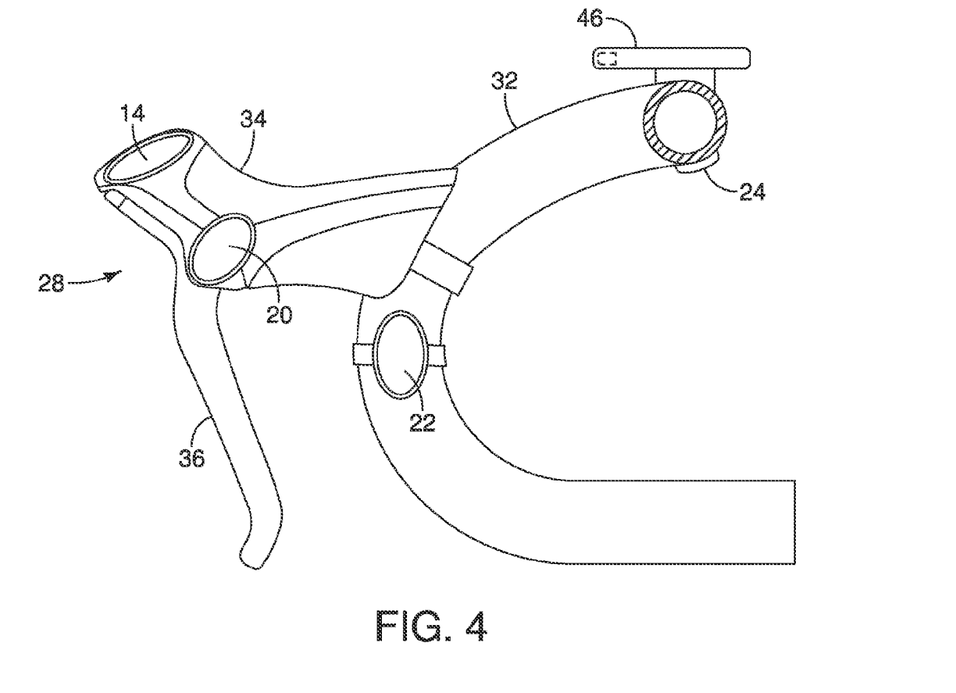
FIG. 4 is a cross-sectional view of the handlebar of the bicycle shown in FIG. 1 taken in a direction toward the right handlebar.
Figure 5:
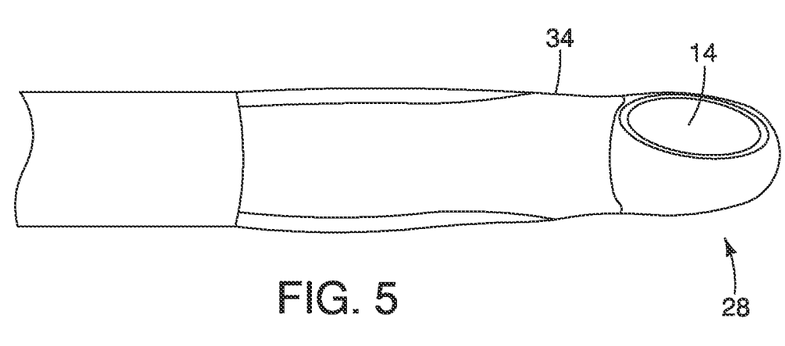
FIG. 5 is a top elevational view of the right handlebar.

FIG. 1 illustrates a bicycle 10 that includes a bicycle component operating device 12 (see FIG. 7) according to a disclosed embodiment. The bicycle 10 can be a manual bicycle or a motor assisted bicycle as known in the art. The bicycle component operating device 12 includes at least one touch sensor. In the example shown in FIGS. 1 through 5, the bicycle component operating device 12 includes a plurality of touch sensors 14, 16, 18, 20, 22, 24 and 26. The touch sensors 14 through 26 can be any type of tactile sensor (e.g. a membrane resistance type sensor, capacitance type sensor or optical sensor) that can detect contact on a surface of the touch sensor by, for example, a person's finger or any other suitable object.

As shown, a touch sensor 14 can be mounted at the top of brake units 28 and 30 that are mounted to the handlebar 32. The brake unit 28 includes a bracket 34 and a brake lever 36. Likewise, brake unit 30 includes a bracket 38 and a brake lever 40. In this example, a touch sensor 14 is mounted to bracket 34, and another touch sensor 14 is mounted to bracket 38. Also, touch sensors 16 and 18 are mounted to the right facing side of brake lever 36. Similarly, additional touch sensors 16 and 18 are mounted to the left facing side of brake lever 40.

As further shown, a touch sensor 20 can be mounted to the left facing side of bracket 34 of brake unit 28. Similarly, another touch sensor 20 can be mounted to the right facing side of bracket 38 of brake unit 30. Also, a touch sensor 22 can be mounted to the left facing side of the right handle portion of handlebar 32. Likewise, another touch sensor 22 can be mounted to the right facing side of the left handle portion of handlebar 32. In this example, the touch sensors 22 are disposed adjacent to and below the brackets 38 and 40. In addition, a touch sensor 24 can be mounted to a downward facing surface of the right handle portion of handlebar 32. Furthermore, a touch sensor 26 can be mounted to handlebar stem 42 that is mounted to a bicycle frame 44. A cycle computer 46 can also be mounted to the handlebar 32 or at any other suitable location on the bicycle 10.

Figure 6:
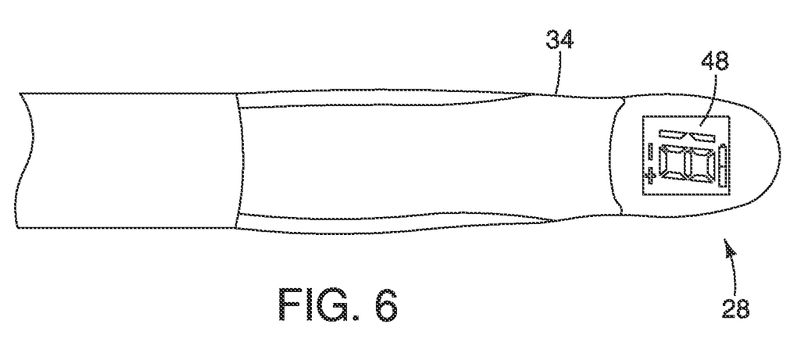
FIG. 6 is an alternative top elevational view of the right handlebar.

The touch sensors 14 through 26 can be mounted as discussed above using any suitable type of fastener or adhesive as understood in the art. Furthermore, the touch sensors 14 through 26 can be mounted to any other suitable location on the bicycle 10, and any suitable number of touch sensors 14 through 26 can be used. The touch sensors 14 through 26 can have any suitable shape, such as circular, oval, square, rectangular and so on. Also, any of the touch sensors 14 through 26 can be incorporated into a display 48, such as an LED or LCE display as shown, for example, in FIG. 6 and as understood in the art. The display 48 can display at least one indicium thereon, and any of the touch sensors 14 through 26 can be incorporated into the display 48 as a touch screen.

Figure 7:
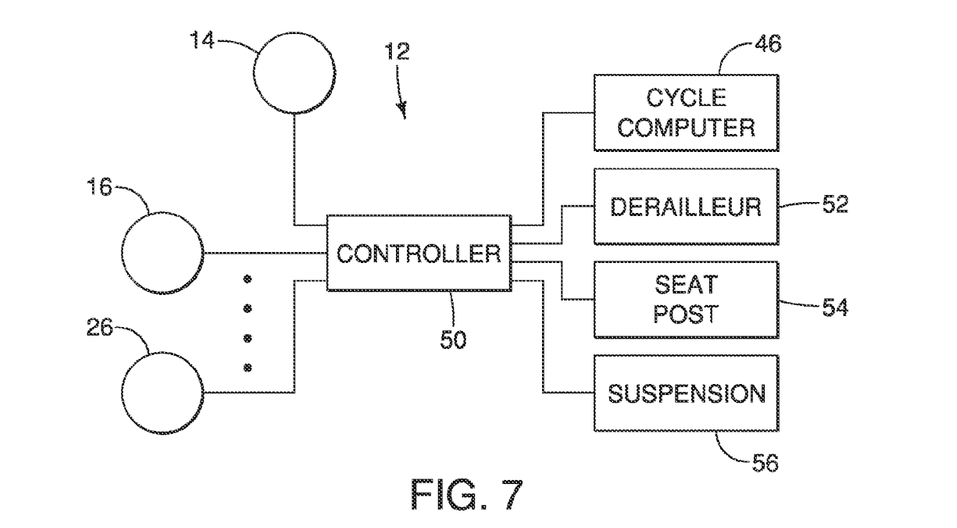
FIG. 7 is a schematic illustrating exemplary components of the bicycle component operating device.

FIG. 7 is a schematic illustrating exemplary components of the bicycle component operating device 12. As shown, the bicycle component operating device 12 includes a controller 50. The controller 50 preferably includes a microcomputer with a control program that controls the bicycle component operating device 12 as discussed herein. The controller 50 can also include other conventional components such as an input interface circuit, an output interface circuit, and storage devices such as a ROM (Read Only Memory) device and a RAM (Random Access Memory) device. The RAM and ROM store processing results and control programs that are run by the controller 50. The controller 50 is operatively coupled to the components of the bicycle component operating device 12, and to the components of the bicycle 10 as appropriate, in a conventional manner. It will be apparent to those skilled in the art from this disclosure that the precise structure and algorithms for the controller 50 can be any combination of hardware and software that will carry out the functions of the embodiments discussed herein.

Figure 13:
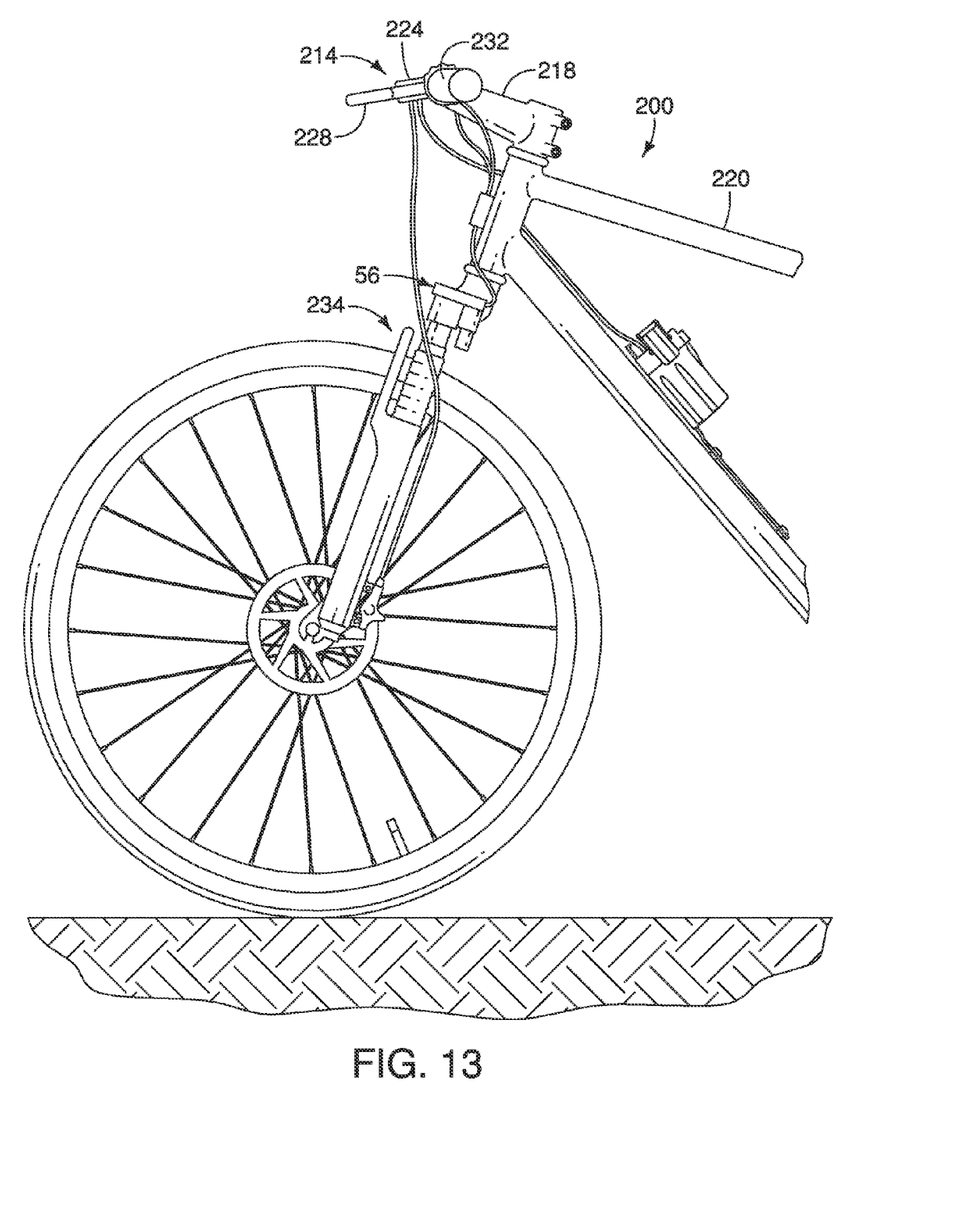
FIG. 13 is a left side elevational view of a further type of bicycle including the bicycle component operating device.
Figure 14:
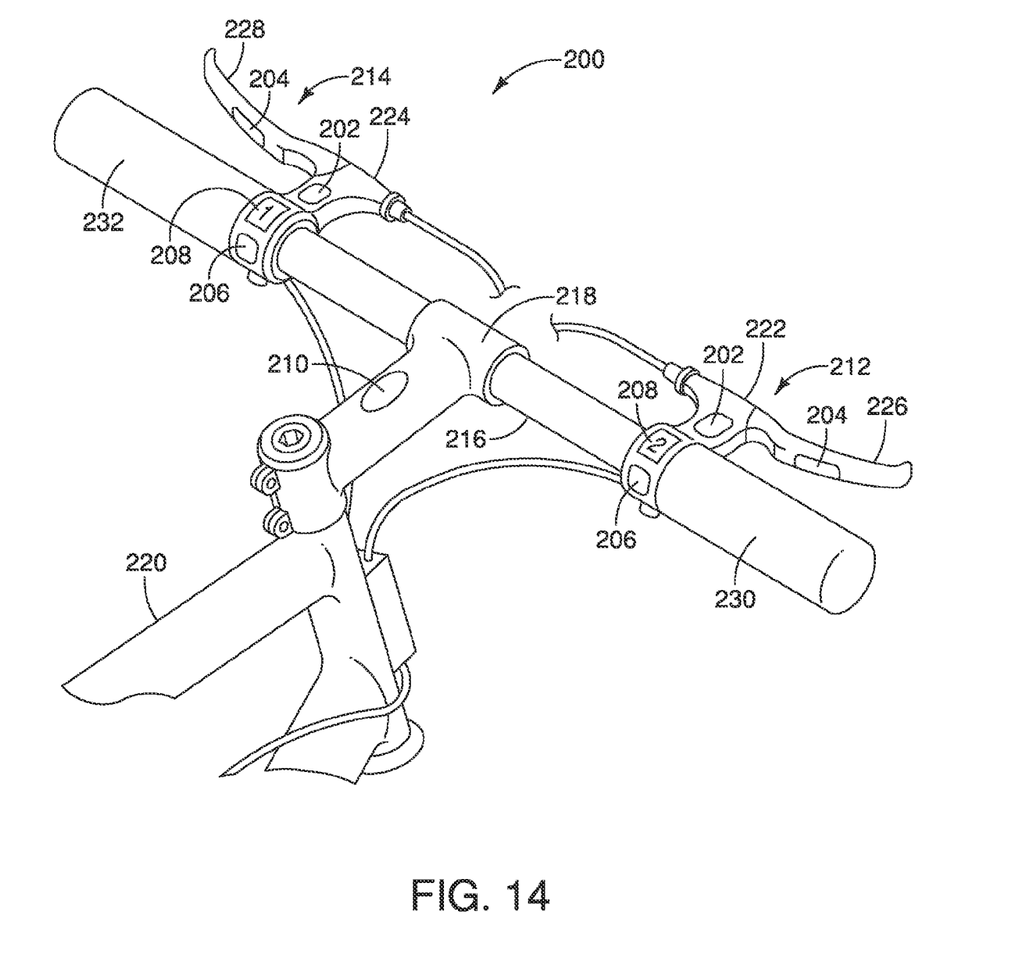
FIG. 14 is a detailed perspective view of the handlebar area of the bicycle shown in FIG. 13.

As discussed in more detail below, the controller 50 is configured to control a bicycle component based on a control signal received from any of the touch sensors 14 through 26. That is, the controller 50 is configured to receive control signals from the touch sensors 14 through 26 via wired or wireless connections as understood in the art. The controller 50 is further configured to communicate via wired or wireless connections with components of the bicycle 10, such as the cycle computer 46, a derailleur 52, an adjustable seat post 54, an adjustable suspension 56 as shown in FIGS. 13 and 14, and any other suitable bicycle component. Therefore, the controller 50 can control the bicycle components based on the control signals received from the touch sensors 14 through 26. The controller 50 can be programmed so that the touch sensors 14 through 26 control certain components. For example, the controller 50 can be programmed so that the control signals received from touch sensors 14 control the suspension 56. The controller 50 can be further programmed so that the control signals received from the touch sensors 16 through 22 control the derailleur 52 and other components to control shifting. The controller 50 can also be programmed so that the touch sensor 24 controls the cycle computer 46 and touch sensor 26 controls the adjustable seat post 54. Naturally, the controller 50 is user configurable and can be programmed and reprogrammed as desired to enable any of the touch sensors 14 through 26 to control any of the bicycle components as deemed suitable.

As can be appreciated from FIGS. 1 through 5, each of the touch sensors 14 through 26 are separate from the bicycle components, such as the cycle computer 46, the derailleur 52, the adjustable seat post 54, the adjustable suspension 56, and any other component that the controller 50 controls based on signals provided by the touch sensors 14 through 26. Each of the touch sensors 14 through 26 is configured to provide a control signal to the controller 50 based on a touching characteristic in which a user performs a subsequent touching of the touch sensor 14, 16, 18, 20, 22, 24 or 26 after performing an initial touching of that touch sensor 14, 16, 18, 20, 22, 24 or 26. The initial touching does not cause the controller 50 to control the bicycle component. All of the subsequent touching discussed herein can be performed without discontinuing touching the touch sensor 14, 16, 18, 20, 22, 24 or 26 between the initial touching and the subsequent touching.

For purposes of example, the operation of controller 50 will be described based on touching characteristics in which touch sensor 14 is touched. However, the controller 50 will operate in the same or a similar manner based on touching characteristics in which any of the touch sensors 14 through 26 are touched.

Figure 8:
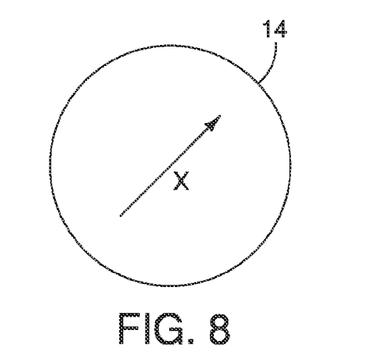
FIG. 8 is a diagram illustrating exemplary touching directions in which a touch sensor of the bicycle component operating device can be touched to control a bicycle component.

Accordingly, the controller 50 can be configured to receive a signal from the touch sensor 14 to control a bicycle component based on the subsequent touching being performed with a predetermined touching movement pattern on the touch sensor. For example, as shown in FIG. 8, a user can initially touch a touch sensor 14 with the user's finger, and then move their finger in a line along the surface of touch sensor 14 for a prescribed touching length X. The touching that occurs when the user first touches the touch sensor 14 can be referred to as an initial touching as discussed herein. The touching that occurs after the user performs this initial touching and moves his or her finger along the touch sensor 14 for the prescribed touching length X can be referred to as a subsequent touching as discussed herein.

The initial touching and the subsequent touching collectively can be referred to as a touching characteristic. This touching characteristic causes the touch sensor 14 to provide the control signal to the controller 50. The controller 50 can determine whether the touching length X is greater than or equal to prescribed length X1 and less than prescribed length X2. If the touching length X is less than prescribed length X1, the controller 50 can disregard the touching characteristic as noise. However, if the touching length X is greater than or equal to prescribed length X1 and less than prescribed length X2, the controller 50 identifies this touching characteristic as a first touching characteristic that provides a first signal as the control signal to the controller 50. Therefore, as discussed in more detail below, the controller 50 can control one of the bicycle components, such as the cycle computer 46, the derailleur 52, the adjustable seat post 54 and the adjustable suspension 56, in a first manner based on this first touching characteristic.

Furthermore, if the controller 50 determines that the touching length X is greater than prescribed length X2, the controller 50 identifies this touching characteristic as a second touching characteristic that provides a second signal as the control signal to the controller 50. Therefore, as discussed in more detail below, the controller 50 can control one of the bicycle components, such as the cycle computer 46, the derailleur 52, the adjustable seat post 54 and the adjustable suspension 56, in a second manner, which is different from the first manner, based on this second touching characteristic, which is different from the first touching characteristic.

Figure 9:
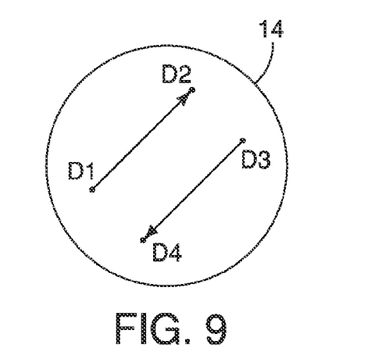
FIG. 9 is a diagram illustrating other exemplary touching directions in which a touch sensor of the bicycle component operating device can be touched to control a bicycle component.

As can be appreciated by one skilled in the art, any of the touch sensors (e.g., touch sensor 14) can be touched in other manners to provide control signals to the controller 50. For example, as shown in FIG. 9, the user can initially touch a touch sensor 14 at a location D1 with the user's finger, and then subsequently move their finger in a line along the surface of touch sensor 14 to a location D2. As with the touching discussed above with regard to FIG. 8, the initial touching and the subsequent touching collectively can be referred to as a touching characteristic. This touching characteristic causes the touch sensor 14 to provide a first signal as the control signal to the controller 50. The controller 50 can identify the initial touching and the subsequent touching between locations D1 and D2 collectively as a first touching characteristic. The controller 50 can thus control one of the bicycle components, such as the cycle computer 46, the derailleur 52, the adjustable seat post 54 and the adjustable suspension 56, in a first manner based on this first touching characteristic as discussed in more detail below.

As further shown in FIG. 9, a user can initially touch a touch sensor 14 with the user's finger at location D3, and then move their finger in a line along the surface of touch sensor 14 to a location D4. As with the touching that occurs between locations D1 and D2, the initial touching and the subsequent touching between locations D3 and D4 collectively can be referred to as a touching characteristic. This touching characteristic causes the touch sensor 14 to provide a second signal as the control signal to the controller 50. The controller 50 can identify the initial touching and the subsequent touching between locations D3 and D4 collectively as a second touching characteristic. The controller 50 can thus control one of the bicycle components, such as the cycle computer 46, the derailleur 52, the adjustable seat post 54 and the adjustable suspension 56, in a second manner, which is different from the first manner, based on this second touching characteristic, which is different from the first touching characteristic.

Figure 10:
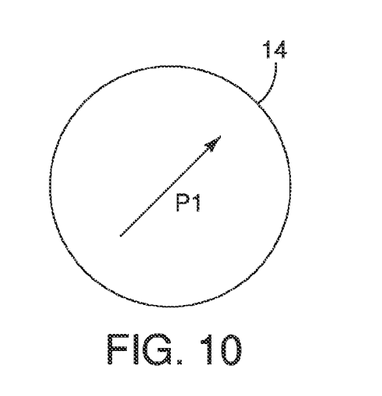
FIG. 10 is a diagram illustrating another exemplary touching manner in which a touch sensor of the bicycle component operating device can be touched to control a bicycle component.

Furthermore, as shown in FIG. 10, the user can initially touch the touch sensor 14 with the user's finger, and then subsequently move their finger in a line along the surface of touch sensor 14 in a pattern P1. As with the touching discussed above, the initial touching and the subsequent touching in the pattern P1 can collectively be referred to as a touching characteristic. This touching characteristic causes the touch sensor 14 to provide a first signal as the control signal to the controller 50. Accordingly, the controller 50 receives the first signal based on the subsequent touching being performed with a first predetermined touching movement pattern P1 on the touch sensor 14. The controller 50 can identify the first predetermined touching movement pattern P1 as a first touching characteristic. The controller 50 can thus control one of the bicycle components, such as the cycle computer 46, the derailleur 52, the adjustable seat post 54 and the adjustable suspension 56, in a first manner based on this first touching characteristic.

Figure 11:
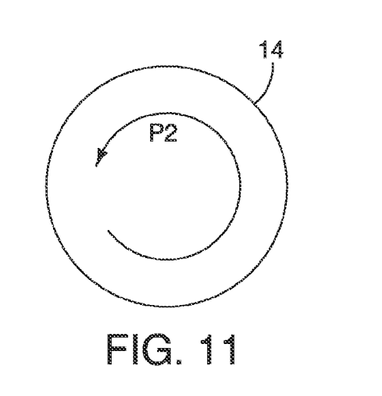
FIG. 11 is a diagram illustrating an exemplary touching pattern in which a touch sensor of the bicycle component operating device can be touched to control a bicycle component.

As shown in FIG. 11, the user can initially touch a touch sensor 14 with the user's finger, and then subsequently move their finger in a line along the surface of touch sensor 14 in a pattern P2 (e.g., in a circular motion). As with the touching discussed above, the initial touching and the subsequent touching in the pattern P2 can collectively can be referred to as a touching characteristic that is different from the first touching characteristic. Accordingly, the controller 50 receives the second signal based on the subsequent touching being performed with a second predetermined touching movement pattern P2 on the touch sensor 14 that is different from the first predetermined touching movement pattern P1.

The controller 50 can identify the second predetermined touching movement pattern P2 as a second touching characteristic. The controller 50 can thus control one of the bicycle components, such as the cycle computer 46, the derailleur 52, the adjustable seat post 54 and the adjustable suspension 56, in a second manner, that is different from the first manner, based on this second touching characteristic that is different from the first touching characteristic.

It should also be noted that the controller 50 can be configurable by a user, or in other words programmable, to identify a first user configurable pattern as the first predetermined touching movement pattern P1 to control the bicycle component in the first manner. Likewise the controller 50 can be configurable to identify a second user configurable pattern as the second predetermined touching movement pattern P2 to control the bicycle component in the second manner. Furthermore, although only two patterns P1 and P2 are shown for exemplary purposes, the controller 50 can be configurable to identify any suitable number of patterns as corresponding predetermined touching movement patterns. For example, each shift stage of the transmission 60 can correspond to a different pattern (e.g., patterns P1, P2 and so on). Accordingly, a user can control the derailleur 52 to shift the transmission 60 directly to a desired shift stage by tracing the appropriate pattern on a touch sensor (e.g., touch sensor 14) without performing a plurality of finger operations (e.g., a plurality of touching operations).

The patterns P1 and P2 can be any desired shapes, such as linear patterns, circular patterns, and so on. Thus, the controller 50 can receive the first signal based on the first predetermined touching movement pattern on the touch sensor 14 that is a first linear movement from between two locations (e.g., locations D1 and D2) on the touch sensor as shown, for example, in FIG. 9. Likewise, the controller 50 can receive the second signal based on the second predetermined touching movement pattern on the touch sensor 14 that is a second linear movement from between two locations (e.g., locations D3 and D4) on the touch sensor 14 that is different from the first linear movement as shown, for example, in FIGS. 9. Alternatively, the controller 50 can receive the first signal based on the first predetermined touching movement pattern on the touch sensor 14 that is a first non-linear movement from between two locations on the touch sensor 14. The controller 50 receives the second signal based on the second predetermined touching movement pattern on the touch sensor 14 that is a second non-linear movement from between two locations on the touch sensor 14 that is different from the first linear movement. These first and second non-linear movements each can be, for example, circular movements as shown in FIG. 11, but can have different diameters. Also, the first and second non-linear movements can be completely different patterns.

Naturally, the touch sensors 14 through 26 can be configured to provide the controller 50 with the first and second signals based on any suitable type of first and second touching characteristics. For example, the controller 50 can be configured to receive a signal from the touch sensor 14 to control the bicycle component based on a predetermined length of time occurring from the initial touching of the touch sensor 14 until the subsequent touching of the touch sensor 14 exceeds a subsequent touching time. That is, the controller 50 can receive the first signal from a touch sensor (e.g., touch sensor 14) based on a first predetermined length of time that occurs from the initial touching of the touch sensor 14 until the subsequent touching of the touch sensor exceeds a first subsequent touching time (e.g., several seconds). The controller 50 can receive the second signal based on a second predetermined length of time that occurs from the initial touching of the touch sensor 14 until the subsequent touching of the touch sensor 14 exceeds a second subsequent touching time that is different from the first predetermined length of time.

Also, the touch sensors 14 through 26 can provide the first and second signals to the controller 50 based on touching speeds. For example, the controller 50 is configured to receive a signal from the touch sensor 14 to control the bicycle component based on the subsequent touching that is performed as discussed above with regard to FIGS. 8 though 11 with a predetermined touching speed. That is, the controller 50 can determine whether the signal received from the touch sensor 14 indicates that the touching speed at which a person's finger, for example, moves across the surface of the touch sensor 14 is greater than or equal to prescribed speed S1 and less than prescribed speed S2. If the touching speed is less than prescribed speed S1, the controller 50 can disregard the touching characteristic as noise. However, if the touching speed is greater than or equal to prescribed speed S1 and less than prescribed speed S2, the controller 50 identifies this touching characteristic as a first touching characteristic that provides a first signal as the control signal to the controller 50. Therefore, as discussed in more detail below, the controller 50 can control one of the bicycle components, such as the cycle computer 46, the derailleur 52, the adjustable seat post 54 and the adjustable suspension 56, in a first manner based on this first touching characteristic.

Furthermore, if the controller 50 determines that the touching speed is greater than or equal to prescribed speed S2 and less than prescribed speed S3, the controller 50 identifies this touching characteristic as a second touching characteristic that provides a second signal as the control signal to the controller 50. Therefore, as discussed in more detail below, the controller 50 can control one of the bicycle components, such as the cycle computer 46, the derailleur 52, the adjustable seat post 54 and the adjustable suspension 56, in a second manner, which is different from the first manner, based on this second touching characteristic, which is different from the first touching characteristic.

Furthermore, the any of the touch sensors 14 through 26 can provide the first and second signals to the controller 50 based on the subsequent touching being performed with a predetermined number of touches. For example, the controller 50 can determine whether the signal received from the touch sensor 14 indicates that the number of times that the touch sensor 14 has been touched during a prescribed period is greater than or equal to prescribed touching number T1 and less than prescribed touching number T2. If the touching number is less than prescribed touching number T1, the controller 50 can disregard the touching characteristic as noise. However, if the touching number is greater than or equal to prescribed touching number T1 and less than prescribed touching number T2, the controller 50 identifies this touching characteristic as a first predetermined touching number (i.e., a first touching characteristic) that provides a first signal as the control signal to the controller 50. Therefore, as discussed in more detail below, the controller 50 can control one of the bicycle components, such as the cycle computer 46, the derailleur 52, the adjustable seat post 54 and the adjustable suspension 56, in a first manner based on this first touching characteristic.

In addition, if the controller 50 determines that the touching number is greater than or equal to prescribed touching number T2 and less than prescribed touching number T3, the controller 50 identifies this touching characteristic as a second predetermined touching number (i.e., a second touching characteristic) that provides a second signal as the control signal to the controller 50. Therefore, as discussed in more detail below, the controller 50 can control one of the bicycle components, such as the cycle computer 46, the derailleur 52, the adjustable seat post 54 and the adjustable suspension 56, in a second manner, which is different from the first manner, based on this second touching characteristic, which is different from the first touching characteristic.

Examples of the different ways in which the controller 50 can control the bicycle components based on the different touching characteristics will now be discussed. As mentioned above, the derailleur 52 is one of the bicycle components that the controller 50 can control based on the touching characteristics. Thus, the controller 50 can control the derailleur 52 to up shift or down shift a transmission 60 (see FIG. 1) based on the first and second touching characteristics. For instance, the controller 50 can be programmed so that one or more of the touch sensors (e.g., touch sensor 20) can control the derailleur 52 to perform up shifting and down shifting. In this arrangement, when the touch sensor 20 is touched according to any of the first touching characteristics discussed above, the controller 50 can control the derailleur 52 to, for example, up shift the transmission 60 once. Thus, when the touch sensor 20 is touched according to any of the second touching characteristics discussed above, the controller 50 can control the derailleur 52 to down shift the transmission 60 once. Naturally, the controller 50 can instead be configured to control the derailleur 52 to down shift the transmission 60 in response to any of the first touching characteristics and to control the derailleur 52 to up shift the transmission 60 in response to any of the second touching characteristics.

Also, the controller 50 can be programmed so that one or more of the touch sensors (e.g., touch sensor 20) can control the derailleur 52 to perform a particular type of up shifting and down shifting. In this arrangement, when the touch sensor 20 is touched according to any of the first touching characteristics discussed above, the controller 50 can control the derailleur 52 to, for example, up shift the transmission 60 once. Thus, when the touch sensor 20 is touched according to any of the second touching characteristics discussed above, the controller 50 can control the derailleur 52 to down shift the transmission 60 a plurality of times. Naturally, the controller 50 can instead be configured to control the derailleur 52 to down shift the transmission 60 once in response to any of the first touching characteristics and to control the derailleur 52 to up shift the transmission 60 a plurality of times in response to any of the second touching characteristics. Also, the controller 50 can be configured to control the derailleur 52 to perform either the up shifting or the down shifting a plurality of times in response to any of the first touching characteristics, and to perform either the up shifting or the down shifting in response to any of the second touching characteristics. For instance, the first or second characteristic indicating the number of touching times can cause the controller 50 to control the derailleur 52 to shift the transmission 60 by a number of positions corresponding to the number of touching times. Furthermore, as discussed above, each shift stage of the transmission 60 can correspond to a different pattern (e.g., patterns P1, P2 and so on). Accordingly, a user can control the derailleur 52 to shift the transmission 60 directly to a desired shift stage by tracing the appropriate pattern on a touch sensor (e.g., touch sensor 14) without performing a plurality of finger operations (e.g., a plurality of touching operations).

Hence, as can be appreciated from the above, the controller 50 can be configured to control the transmission 60 in a first manner based on a first touching characteristic being performed as the touching characteristic such that a first command is received as the control signal by the controller 50. The controller 50 can be further configured to control the transmission 60 in a second manner, which is different from the first manner, based on a second touching characteristic being performed as the touching characteristic, which is different from the first touching characteristic, such that a second command is received as the control signal by the controller 50. In this example, the first command can be an up shift or a down shift command, the second command is the other of the up shift command or the down shift command.

Furthermore, the controller 50 can be configured to control the adjustable seatpost 54 to move up or down based on the control signal received by the controller 50 in accordance with the first and second touching characteristics. For example, the controller 50 can be programmed so that one or more of the touch sensors (e.g., touch sensor 26) can control the adjustable seatpost 54 to move up and down. In this arrangement, when the touch sensor 26 is touched according to any of the first touching characteristics discussed above, the controller 50 can control the adjustable seatpost 54 to, for example, move the adjustable seatpost 54 up to a prescribed position. Thus, when the touch sensor 26 is touched according to any of the second touching characteristics discussed above, the controller 50 can control the adjustable seatpost 54 to move the adjustable seatpost 54 down to a prescribed position. Naturally, the controller 50 can instead be configured to control the adjustable seatpost 54 to move the adjustable seatpost 54 down to a prescribed position in response to any of the first touching characteristics and to control the adjustable seatpost 54 to move the adjustable seatpost 54 up to a prescribed position in response to any of the second touching characteristics.

Also, the controller 50 can be programmed so that one or more of the touch sensors (e.g., touch sensor 26) can control the adjustable seatpost 54 to move the adjustable seatpost 54 perform up or down one position or multiple positions. In this arrangement, when the touch sensor 26 is touched according to any of the first touching characteristics discussed above, the controller 50 can control the adjustable seatpost 54 to, for example, move the adjustable seatpost 54 up one position. Thus, when the touch sensor 26 is touched according to any of the second touching characteristics discussed above, the controller 50 can control the adjustable seatpost 54 to move adjustable seatpost 54 down a plurality of positions. Naturally, the controller 50 can instead be configured to control the adjustable seatpost 54 to move the adjustable seatpost 54 down once in response to any of the first touching characteristics and to control the adjustable seatpost 54 to move the adjustable seatpost 54 up a plurality of times in response to any of the second touching characteristics. Also, the controller 50 can be configured to control the adjustable seatpost 54 to move the adjustable seatpost 54 either up or down a plurality of times in response to any of the first touching characteristics, and to move the adjustable seatpost 54 either up or down a plurality of times in response to any of the second touching characteristics. For instance, the first or second characteristic indicating the number of touching times can cause the controller 50 to control the adjustable seatpost 54 to move up or down by a number of positions corresponding to the number of touching times.

In addition, the controller 50 can be configured to control the cycle computer 46 to operate in a first mode or a second mode based on the control signal received by the controller 50 in accordance with the first and second touching characteristics. For example, the controller 50 can be programmed so that one or more of the touch sensors (e.g., touch sensor 24) can control the cycle computer 46 to operate in the first or second mode. In this arrangement, when the touch sensor 24 is touched according to any of the first touching characteristics discussed above, the controller 50 can control the cycle computer 46 to operate in a first mode. Thus, when the touch sensor 24 is touched according to any of the second touching characteristics discussed above, the controller 50 can control the cycle controller 46 to operate in a second mode. Naturally, the controller 50 can instead be configured to control the cycle computer 46 to operate in the second mode in response to any of the first touching characteristics and to control the cycle computer 46 to operate in the first mode in response to any of the second touching characteristics. For example, a display device of the cycle computer 46 can display first information in the first mode and can display second information in the second mode. The first and second information include at least one of bicycle speed, cadence, gear position, gear ratio, heart rate, output power of rider, map, navigation root and clock.

Figure 12:
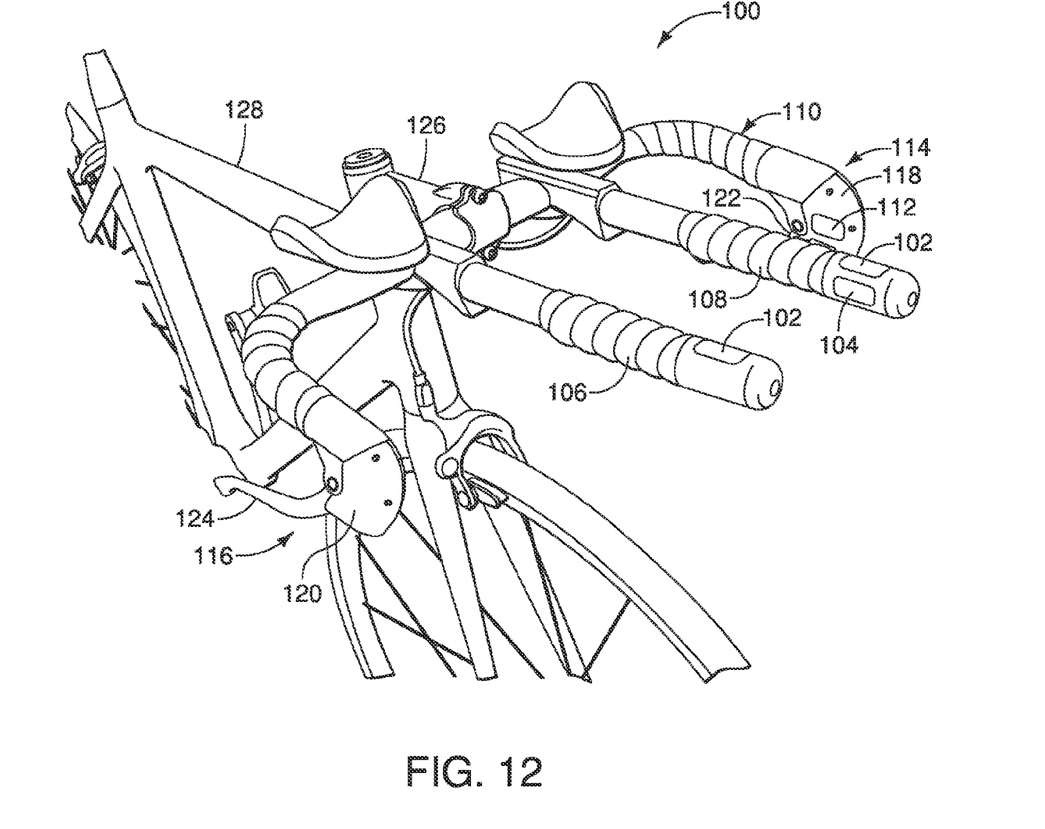
FIG. 12 is a detailed perspective view of the handlebar area of another type of bicycle including the bicycle component operating device.

It should be noted that although two different type of touch characteristics are described for exemplary purposes, the controller 50 can be configured to recognize any suitable number of touching characteristics, such as touching patterns, touching lengths, touching numbers, touching directions, durations of touching times, and so on, and to control the bicycle components in a corresponding manner as discussed herein. Furthermore, the above features can be employed in different types of bicycles such as those shown in FIGS. 12 through 14. For example, FIG. 12 is a detailed perspective view of the handlebar area of a time trial bicycle 100 including the bicycle component operating device 12. The time trial bicycle 100 can include touch sensors 102 and 104 that are disposed on handlebars 106 and 108. Also, the time trial bicycle 100 can include another handlebar 110 that includes touch sensors 112 that are disposed on the inner facing surfaces of brake units 114 and 116. The brake unit 114 includes a bracket 118 and a brake lever 122. Likewise, brake unit 116 includes a bracket 120 and a brake lever 124. As further shown, the handlebar 110 is secured by a handlebar stem 126 to bicycle frame 128.

The touch sensors 102, 104 and 112 can be similar to touch sensors 14 through 26 as discussed above. Accordingly, the controller 50 can be configured to control the components of the bicycle 100 in the manner discussed herein.

In addition, FIGS. 13 and 14 illustrate an example of features of a trail bicycle 200. The trail bicycle 200 includes touch sensors 202, 204, 206, 208 and 210 which can be similar to the touch sensors 14 through 26 as discussed above. In this example, touch sensors 202 and 204 are disposed on brake units 212 and 214 that are coupled to a handlebar 216. A handlebar stem 218 couples the handlebar 216 to the bicycle frame 220. Touch sensor 210 can be mounted to handlebar stem 218 in this example. Touch sensors 202 are disposed on the top surfaces of the brackets 222 and 224 of brake units 212 and 214, respectively. Also, touch sensors 204 are disposed on surfaces of the brake levers 226 and 228 of the brake units 212 and 214, respectively. In addition, touch sensors 206 and 208 are disposed on brackets 222 and 224. In this example, the touch sensors 208 can be incorporated as discussed above with regard to FIG. 6 into a display that displays the shift position. Also, grips 230 and 232 are disposed on opposite sides of the handlebar 216 as understood in the art.

Furthermore, the trail bicycle 200 typically includes an adjustable suspension 56 at the front wheel 234 as shown in FIG. 13. However, the other types of bicycles 10 and 100 discussed herein can also employ an adjustable suspension 56 as desired.

As discussed above, the adjustable suspension 56 is one of the bicycle components that the controller 50 can control based on the first and second touching characteristics. For example, the controller 50 can be configured to control the adjustable suspension 56 to operate in a first status or a second status based on the control signal received by the controller 50 in accordance with the first and second touching characteristics. For example, the controller 50 can be programmed so that one or more of the touch sensors (e.g., touch sensor 206) can control the adjustable suspension 56 to operate in the first or second status. The first and second statuses can be a rock out status, free status, high stroke status, low stroke status, high damping status, low damping status, and so on.

In this arrangement, when the touch sensor 26 is touched according to any of the first touching characteristics discussed above, the controller 50 can control the adjustable suspension 56 to operate in a first status. Thus, when the touch sensor 26 is touched according to any of the second touching characteristics discussed above, the controller 50 can control the adjustable suspension 56 to operate in a second status. Naturally, the controller 50 can instead be configured to control the adjustable suspension 56 to operate in the second status in response to any of the first touching characteristics and to control the adjustable suspension 56 to operate in the first status in response to any of the second touching characteristics.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle component operating device comprising:
    at least one touch sensor, the at least one touch sensor configured to detect contact on a surface of the at least one touch sensor, and the at least one touch sensor being disposed on a rightward facing side or a leftward facing side of at least one of a bracket of a brake, a bracket of a shifter, a brake lever, a handlebar and a handlebar stem; and
    a controller configured to control a bicycle component based on a control signal from the at least one touch sensor;
    the at least one touch sensor being separate from the bicycle component and configured to provide the control signal to the controller based on a touching characteristic in which a user performs a subsequent touching of the at least one touch sensor after performing an initial touching of the at least one touch sensor such that the initial touching does not cause the controller to control the bicycle component, the subsequent touching including a movement along the surface of the at leak one touch sensor with a touching length that is equal to or greater than a first prescribed length and smaller than or equal to a second prescribed length, the second prescribed length being larger than the firs prescribed length.

2. The bicycle component operating device according to claim 1, wherein
    the bicycle component further includes a display that is configured to display at least one indicium thereon, and the at feast one touch sensor is incorporated into the display as a touch screen.

3. The bicycle component operating device according to claim 1, wherein
    the controller configured to control a transmission to perform a shifting operation based on the control signal.

4. The bicycle component operating device according to claim 1, wherein.
    the controller configured to control a suspension to change suspension status based on the control signal.

5. The bicycle component operating device according to claim 1, wherein
    the controller configured to control a seatpost to move up or down based on the control signal.

6. The bicycle component operating device according to claim 1, wherein
    the controller is configured to control a cycle computer to operate in first mode based on a first condition of the control signal and to operate in a second mode based on a second condition of the control signal.

7. The bicycle component operating device according to claim 1, wherein,
    the controller is configured to be user configurable and to be programmed and reprogrammed as desired to enable the at least one touch sensor to control the at least one bicycle component.

8. A bicycle component operating device comprisng:
    at least one touch sensor, the at least one touch sensor configured to detect contact on a surface of the at least one touch sensor, and the at least one touch sensor being disposed on at least one of a bracket of a brake, a bracket of a shifter, a brake lever, a handlebar and a handlebar stem; and a controller configured to control a bicycle component based on a control signal from the at least one touch sensor;

the at least one touch sensor being separate from the bicycle component and configured to provide the control signal to the controller based on a touching characteristic in which a user per a subsequent touching of the at least one touch sensor after performing an initial touching of the at least one touch sensor such that the initial touching does not cause the controller to control the bicycle component, the subsequent touching including a movement along the surface of the at least one touch sensor, the controller being configured to control the bicycle component in a first manner upon the movement along the surface of the at least one touch sensor having a touching length equal to or longer than a first prescribed length and shorter than a second prescribed length such that a first signal is received as the control signal by the controller; and the controller being configured to control the bicycle component in a second manner, which is different from the first manner, upon the movement along the surface of the at least one touch sensor having a touching length equal to or longer than the second prescribed length such that a second signal is received as the control signal by the controller.

9. The bicycle component operating device according to claim 8, wherein the controller is configured to control a transmission in a first manner in response to the first signal being received by the controller, and the controller is configured to control the transmission in a second manner, which is different from the first manner, in response to the second signal being received by the controller.

10. The bicycle component operating device according to claim 9, wherein the controller is configured to control the transmission to shift once based on the first signal and to shift a plurality of times based on the second signal.

* * * * *